United States Patent [19]

Torterotot

[11] Patent Number: 5,178,304
[45] Date of Patent: Jan. 12, 1993

[54] DOSER-DISPENSER FOR AT LEAST ONE PASTY AND/OR LIQUID PRODUCT

[75] Inventor: Roland Torterotot, Longvilliers, France

[73] Assignee: Erca Holding, Les Ulis Cedex, France

[21] Appl. No.: 635,529

[22] PCT Filed: May 11, 1990

[86] PCT No.: PCT/FR90/00333

§ 371 Date: Jan. 4, 1991

§ 102(e) Date: Jan. 4, 1991

[87] PCT Pub. No.: WO90/13483

PCT Pub. Date: Nov. 15, 1990

[30] Foreign Application Priority Data

May 12, 1989 [FR] France ................. 89 06316

[51] Int. Cl.⁵ ............... B65B 3/32; F16K 41/10
[52] U.S. Cl. .................. 222/333; 222/409; 222/504; 417/552; 251/331; 251/335.3
[58] Field of Search ............. 222/309, 409, 243, 246, 222/333, 504; 417/545, 546, 548, 552, 553; 251/335.1, 335.2, 331; 92/181 P, 182

[56] References Cited

U.S. PATENT DOCUMENTS

| 2,105,864 | 1/1938 | Saunders. | |
|---|---|---|---|
| 2,831,326 | 4/1958 | Richards et al. | 251/335.3 X |
| 3,399,695 | 9/1968 | Stehlin | 251/331 X |
| 3,403,845 | 10/1968 | Marshall | 417/552 |
| 3,507,584 | 4/1970 | Robbins, Jr. | 417/552 X |
| 3,812,398 | 1/1974 | Kozel et al. | |
| 3,874,630 | 4/1975 | Novey | 251/331 X |
| 4,712,576 | 12/1987 | Ariizumi et al. | 92/182 X |

FOREIGN PATENT DOCUMENTS

| 0269507 | 6/1988 | European Pat. Off. | |
|---|---|---|---|
| 383730 | 10/1923 | Fed. Rep. of Germany | 417/552 |
| 594939 | 7/1932 | Fed. Rep. of Germany | 417/552 |
| 2357018 | 5/1975 | Fed. Rep. of Germany. | |
| 1807542 | 6/1980 | Fed. Rep. of Germany. | |
| 71618 | 11/1948 | Norway | 417/552 |

Primary Examiner—Michael S. Huppert
Assistant Examiner—Kenneth DeRosa
Attorney, Agent, or Firm—Ladas & Parry

[57] ABSTRACT

In the doser-dispenser, the doser-piston 28 is carried by a first control tube 2 and the valve 32a forming with the central passage 32b of said piston 28 an intake valve 32 is situated on the side of the supply chamber 25 and is carried by a second control tube 35 guided in the first tube 2 and extending beyond the lower end of the latter. Each tube 2, 35 is surrounded by and integral with a bellows 6, 38 of which the inside is connected permanently to the outside atmosphere, the top end of the bellows being fixed either to housing 3 or to the lower end of the first tube 2. The second tube 35 with its intake flap 32a is controlled outside of the housing 3 by means of the piston 36 of a jack.

22 Claims, 8 Drawing Sheets

DOSER-DISPENSER FOR AT LEAST ONE PASTY AND/OR LIQUID PRODUCT

FIELD OF THE INVENTION

The present invention relates to a doser-dispenser for at least one pasty and/or liquid product contained under pressure in at least a first storage reservoir, the doser-dispenser being of the type comprising in a first cylindrical housing, on the one hand, an upper supply chamber connected, by a more or less long supply conduit, to said first storage reservoir, and, on the other hand, a lower dosing chamber separated from said supply chamber by a doser piston fixed to the lower end of a control member penetrating in said first housing, sliding in tight manner in said first housing and provided with a central passage adapted to be obturated by an intake valve of which the obturation member urged by a return spring is guided with respect to said piston and cooperates with a valve seat surrounding said central passage, a dispensing chamber provided downstream of the dosing chamber, as well as an ejection valve of which the obturation member loaded by a spring is disposed in said dispensing chamber.

BACKGROUND AND PRIOR ART

In a known doser-dispenser, for example disclosed in German Patent DE-3 024 489, the intake flap is disposed in the dosing chamber and serves as check valve opening and closing automatically solely as a function of the ascending and of the descending movement. In addition, the intake flap is guided directly on the piston and the return spring of said valve is provided at the level of the central passage of the piston. This results in a considerable lack of precision in the dosage, particularly when the product to be dosed is of pasty consistency. In addition, the known doser-dispenser does not lend itself to maintaining sterility inside the supply and dosing chambers.

SUMMARY OF THE INVENTION

An object of the present invention is to overcome the drawbacks of the known doser-dispenser and to propose measures rendering it adapted to conserve a sterile environment whilst enabling a high precision of dosage to be attained.

This object is attained with a doser-dispenser previously defined in that the control member of the doser-piston is constituted by a first control tube of which the end adjacent the intake valve is obturated in tight manner; the obturation member such as a flap of the intake valve is situated on the side of the supply chamber and is carried by the lower closed end of a second control tube guided in the first control tube and extending beyond the lower end thereof; on its section penetrating in the housing, each control tube is surrounded by a bellows; the annular space existing between the section of the first control tube penetrating in said housing and the first bellows is permanently connected to the atmosphere; the upper end of the first bellows surrounding the first control tube is fixed in tight manner on the housing wall traversed by said first tube and the lower end of the first bellows is fixed in tight manner on the lower end part of said first tube; the upper end of the second bellows surrounding the second control tube over its section extending beyond the lower end of the first control tube is fixed in tight manner on the lower end of the first tube below the first bellows, whilst the lower end of the second bellows is fixed in tight manner on the lower end of the second tube or on the intake flap integral with said second tube, and the upper end part of the second control tube is guided in tight manner in the first tube and presents, at its upper end, a control piston which separates the inner volume of the first tube into two chambers of which one is connected to atmosphere and comprises the return spring acting on the intake flap and of which the other is capable of being connected to a source of compressed air or to atmosphere, the pressure of compressed air established in said other chamber acting on said intake flap in the direction opposite that of the corresponding return spring.

Thanks to this concept, the doser-dispenser lends itself to a precise dosage of the product in a sterile environment. In addition, by varying the stroke of the doser-piston, the quantity of product dosed and dispensed per delivery stroke of the piston may be varied. However, the more or less long momentary opening during the delivery stroke of the doser-piston also makes it possible to vary the quantity or quantities of product dispensed per delivery stroke.

In order to perfect the sterility and precision of the doser-dispenser, it is advantageous if the obturation member of the ejection valve is carried by the closed end of a third control tube which, its section penetrating in the dispensing chamber of the dispensing housing, is surrounded by a third bellows whose ends are fixed in tight manner, on the one hand, on the side of the obturation member of the ejection valve, on said third tube and, on the other hand, on the housing wall traversed by said third control tube of which the other end carries, outside said housing traversed by the product to be dispensed, a piston controlling a jack comprising two chambers located on either side of said piston and of which one is capable of being connected alternately to the outside atmosphere or to a source of compressed air and of which the other is provided with a return spring acting on said piston and the obturation member, against the pressure established in the chamber, in the sense of opening or closure of the ejection valve.

This arrangement makes it possible to obtain remarkable precision as regards the unitary quantities of product dispensed, particularly when the closure of the ejection valve is controlled by compressed air acting on the piston of the jack against the return spring.

Doser-dispensers of the type comprising a bellows which surrounds the control member over at least a large part of the section penetrating in the housing traversed by the product are known, for example by French Patent 2 609 697 (87 00531) and its Certificate of Addition 2 618 124 (87 09966). In that case, one end of the bellows is generally fixed on the housing wall around the opening for passage of the control member, whilst the other end of said bellows is fixed, likewise in tight manner, on the end part of the section of the control member, section penetrating inside said housing.

The doser-dispensers of food products must be sterilized in situ after every emptying and cleaning. Such sterilization is effected, in particular when it is question of a doser-dispenser of sterile product, at temperatures of the order of 130° C. to 150° C. and at pressures of the order of 4.0 to 5.0 kg/cm². It has proved that the membranes available on the market, generally made of a synthetic material such as polyurethane, polypropylene, etc... have a fairly short life, are rapidly pierced and must be frequently replaced. In order to reduce these drawbacks, French Certificate of Addition 2 618 124 has already proposed to make the membrane in the form of a bellows cut in the mass of a block of synthetic material such as polytetrafluoroethylene. This type of bellows gives satisfactory results of exploitation, but is of high cost price and delicate to produce.

It is an object of the present invention to overcome these drawbacks and to propose a doser-dispenser allowing the use of bellows available on the market, capable of withstanding for a long time the repeated operations of sterilization.

In the case of a doser-dispenser of the type mentioned above, this object is attained in that each annular fold of each bellows is associated with a rigidifying ring disposed in said bellows and around the corresponding control tube so as to be able to slide along said tube, following the axial movements of extension or of compression or retraction of the bellows, and the annular space existing between each bellows and the corresponding tube permanently communicates with the outside atmosphere.

Thanks to this concept, the housings and the bellows as well as all the other elements and members located inside the doser-dispenser may firstly be washed and cleaned in position of extension of the bellows, and, during the application of a high pressure inside the housings, the bellows may be placed in compressed position in which the different lateral sides of the folds are firmly applied, on the one hand, one against the other and, on the other hand, against one of the rigidifying rings, the apices of the folds of the bellows being supported by the rigidifying rings and the hollows of the folds by the control tube against which they rest.

It should be noted that the state of the art, for example illustrated by U.S. Pat. No. 2 105 864, already discloses bellows provided with rigidifying rings. However, in these cases, the bellows employing rigidifying rings are used within the framework of valves exposed to high pressures and/or to strongly corrosive fluids with obturation members of which the displacements from one extreme position to the other are slight, slow and infrequent and generally controlled by an endless screw mechanism. It might therefore be feared that these rigidifying rings cannot function correctly in a doser-dispenser of which the doser-piston effects several tens of relatively large strokes per minute. It has been surprizingly proved that, by not exceeding a maximum ratio of 2 between the axial opening of one fold of the bellows and the corresponding radial width of the rigidifying ring, such rings might also be used in a doser-dispenser according to the invention.

BRIEF DESCRIPTION OF THE FIGURES OF THE DRAWING

The different features and characteristics of the invention will be even better understood with the aid of the following description of several embodiments, with reference to the accompanying drawings, in which.

DETAILED DESCRIPTION

An intermediate assembly 1 of a doser-dispenser comprises a control member 2 generally in the form of a tube but, if necessary and under certain conditions, may also be in the form of a solid rod. This intermediate assembly 1 is used in particular in a doser-dispenser of pasty and/or liquid product where a section, for example a lower section 2a, of the control tube 2 is intended to penetrate in a sterile housing 3 in isolation from the outside atmosphere or other polluted environment. This section 2a of the control tube 2 carries, at its end part located in the housing 3, a movable element 4 such as an obturation member, in particular a flap of an intake valve, a doser-piston, an ejection pipe, etc..

The other end of the control tube 2 passing through a wall 3a of the housing 3, end located in a polluted environment or in the outside atmosphere, cooperates with an actuation mechanism 5 such as a single- or double-acting jack which imparts thereto rectilinear reciprocating movements.

This intermediate assembly 1 comprises a membrane in the form of bellows 6 which surrounds the control tube 2 over at least half, and preferably the major part of the section 2a penetrating in the sterile housing 3. One end, for example the upper end 6a, of the bellows 6 is fixed in tight manner on the housing wall 3a around the opening 7 for passage of the control tube 2. The other end 6b of the bellows 6 is fixed, likewise in tight manner, on the end part of the section of tube 2a penetrating in the housing 3, or on the movable element 4 integral with the extreme part of said tube section 2a.

It will be noted that, towards the end carrying the movable element 4, the control tube 2 is obturated in tight manner by any appropriate means. The section of tube 2a penetrating in the sterile housing 3 is provided, in the zone surrounded by the bellows 6, with a plurality of rigidifying rings 8 of which each covers said section of tube 2a and is disposed opposite and in contact with the apex 6c of the annular bellows fold 6d. The inner opening 8a of the ring 8 surrounds the control tube 2 with a sufficient radial clearance to be able to slide along said tube 2, following the axial movements of extension or of retraction of the bellows 6 which is generally made of a conventional synthetic material such as polyurethane, polypropylene, vinyl chloride, etc..

In position of compression or retraction of the bellows 6, the radial width LP of a bellows fold 6d is substantially equal to the sum of the thickness ES of the wall of the bellows 6, and of the radial width LR of a rigidifying ring (LP=ES+LR). In the case of the bellows 6 frequently effecting alternate movements of extension and of retraction, for example more than ten of these movements per minute, it is advantageous not to exceed a value of 2 for the ratio R between the maximum axial opening (extension) OM of a bellows fold 6d and the radial width LR of a ring 8. This ratio R is preferably included between 0.8 and 1.5. The annular space 9 which exists between the section 2a of the control tube 2 and the bellows 6 and which contains the rigidifying rings 8, is permanently connected to the atmosphere. In order to establish this permanent connection between the annular space 9 and the outside atmosphere, a longitudinally ribbed annular guide may be provided, disposed in the opening 7 for passage of the housing 3 around the control tube 2, with the result that the longitudinal ribs of the annular guide bear against the tube 2 and the longitudinal grooves between the ribs of said guide ensure connection of the annular space 9 to the outside atmosphere. According to an advantageous variant, the control tube 2 comprises a plurality of transverse passages 2b of which certain are located opposite the bellows 6 and of which at least one other is provided at the extreme part of the tube 2, said part always remaining outside the housing 3, these transverse passages 2b connecting the interior of the tube 2, on the one hand, to the annular space 9 and, on the other hand, to the outside atmosphere. These transverse passages 2b may be constituted by relatively short longitudinal slots or perforations, for example circular, made in the wall of the control tube 2 and distributed over the periphery of said tube 2 opposite the bellows 6 and at the outer end of said tube 2.

In order to increase the life of the bellows 6, it is advantageous to provide at each end 6a, 6b thereof an annular half-fold 6e, 6f and to associate said half-fold 6e or 6f with an annular bearing shoulder 10a or 10b of which the face opposite the bellows 6 is parallel to the rigidifying rings 8 and perpendicular to the axis of the control tube 2. The bearing shoulder 10a, 10b is preferably located inside the bellows 6. The shoulders 10b located nearest the movable element 4 is integral with the control tube 2 and the shoulder 10a located at the level of the housing wall 3a traversed by said tube 2 is fixed to said wall 3a or to another element which is integral with this wall 3a. It should be noted that, in position of complete retraction or compacted position of the bellows 6, each bellows fold 6d is applied, on the one hand, against an adjacent fold and, on the other hand, against the rigidifying ring 8 which is covered by said bellows fold 6d and each extreme half-fold 6e or 6f bears against the corresponding bearing shoulder 10a or 10b. Of course, this position of complete retraction of the bellows 6 is not one of the two normal operating positions, but is the one which is used exclusively during the process of sterilization inside the housing 3.

In order to facilitate assembly of the bellows 6, on the one hand, on the control tube 2 and, on the other hand, on the housing wall 3a, each bellows end 6a, 6b comprises a profiled annular fixing bead 6g to which is joined the corresponding extreme half-fold 6e or 6f of the bellows 6. This joint is preferably effected on the radially outer part of said half-fold 6e or 6f. As is clearly seen in FIGS. 1 and 2, the annular grooves and ribs of the two sectioned beads each constituting one of the ends 6a, 6b of the bellows 6, cooperate with corresponding annular ribs and grooves which constitute retaining housings and are made either on a bearing shoulder 10a, on the housing wall 3a, or on the extreme part of the control tube 2 carrying the movable element 4. It should be noted that the lower bearing shoulder 10b may be housed around the control tube 2 in a coaxial annular cavity of the lower end 6b of the bellows 6, said end 6b being shaped as a profiled bead.

Figure 1:
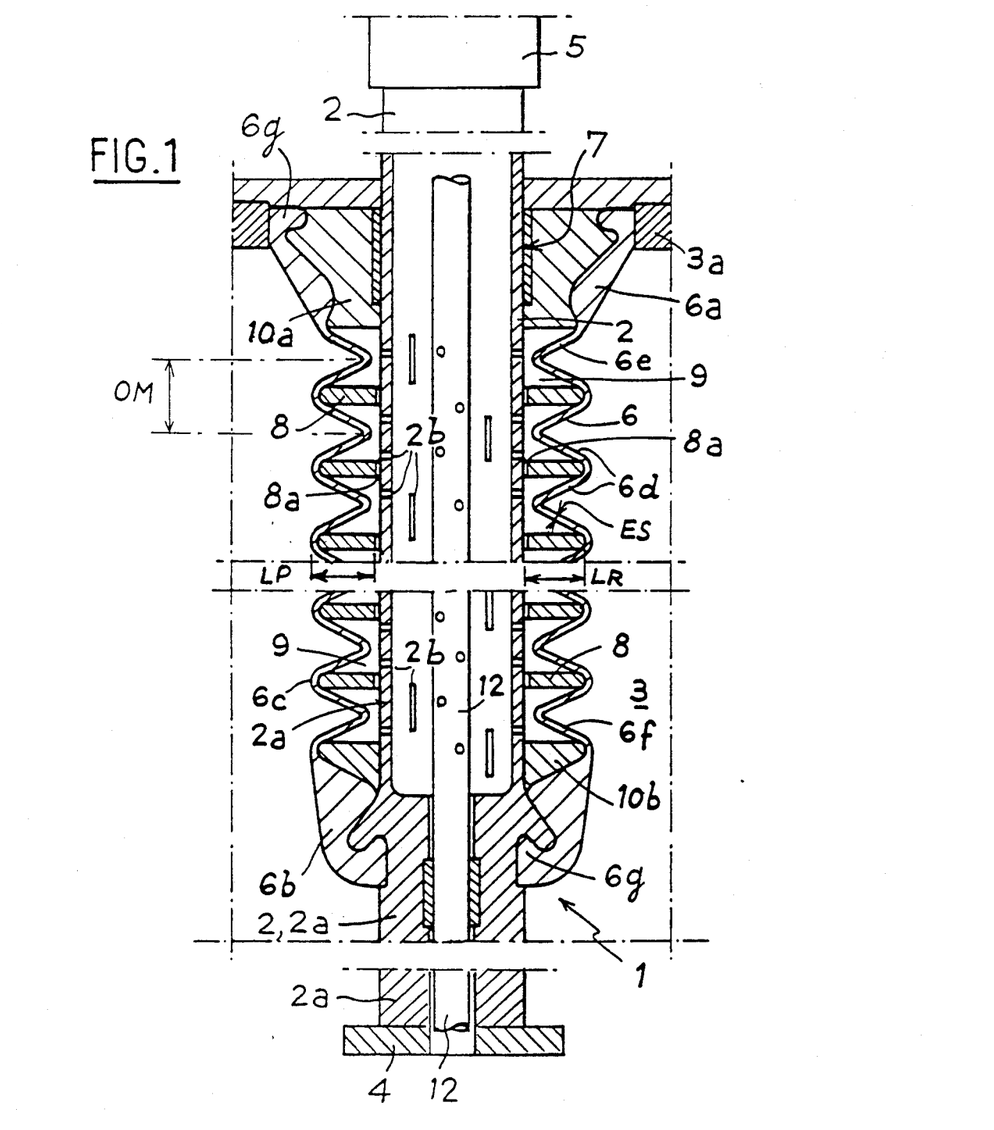
FIG. 1 is a partial enlarged view in elevation of an axial section through an intermediate part of a doser-dispenser according to the invention, showing said device in position of extension.
Figure 2A:
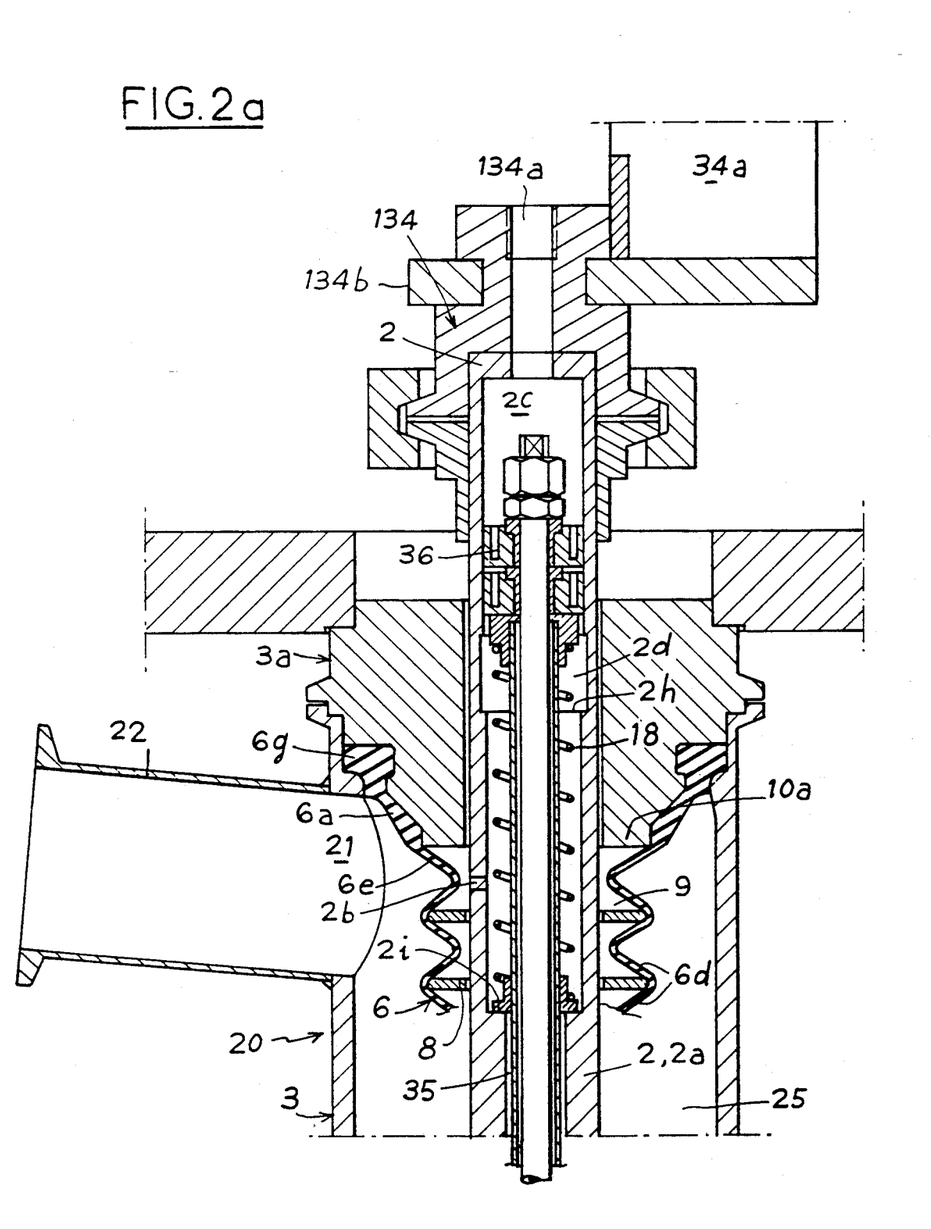
FIGS. 2a and 2b are views in elevation of an axial section respectively through the upper part and lower part for dosing of a doser-dispenser according to the invention.
Figure 2B:
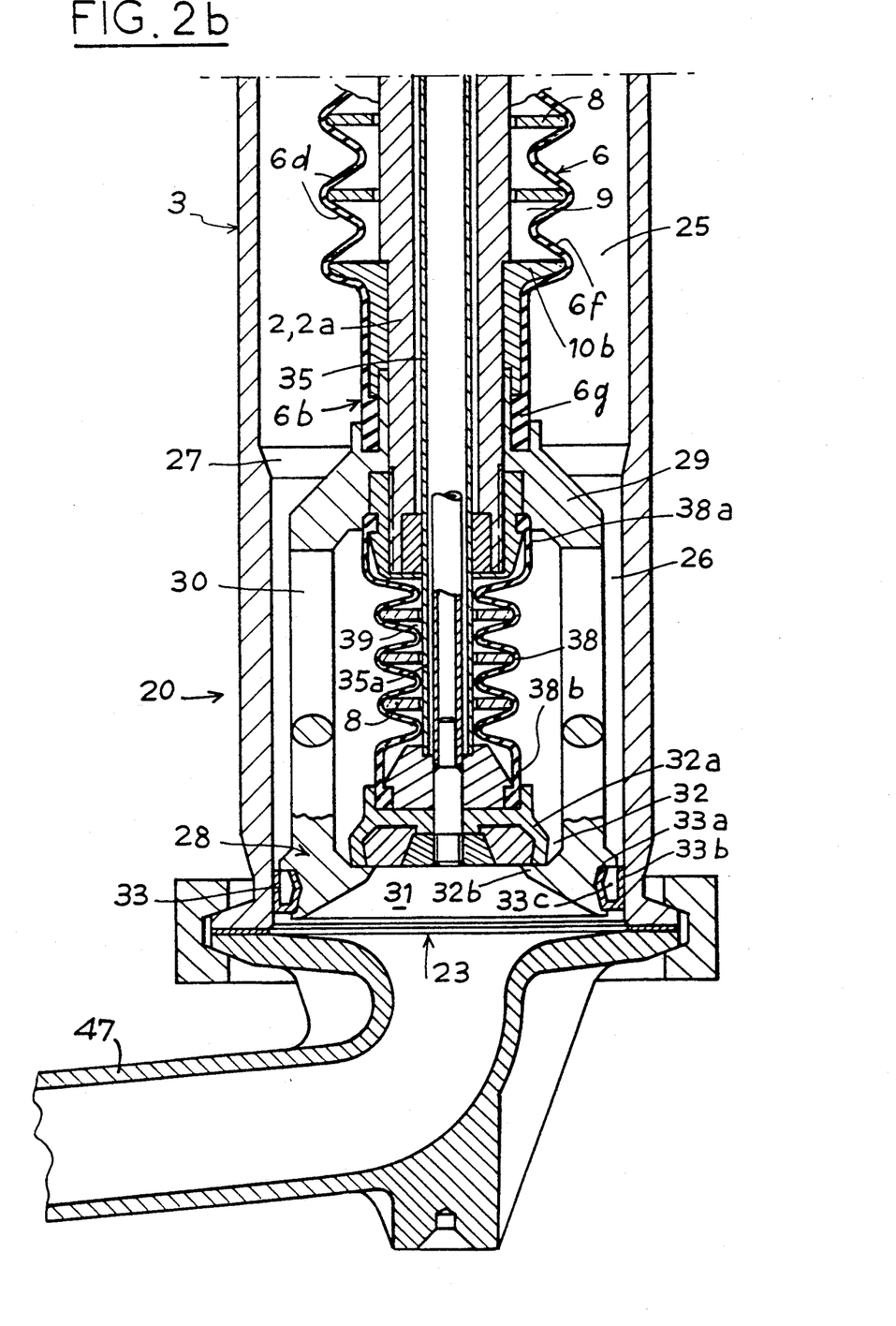

The general structure of this intermediate assembly 1 may be adapted to several control tubes, for example two control tubes 2 and 12 disposed coaxially and one partly in the other, as is schematically illustrated in FIG. 1 and will be described in greater detail with reference to the different variants of a doser-dispenser applying the general structure of this intermediate assembly 1.

As shown in FIGS. 2a, 2b and 3 to 7, the doserdispenser 20 comprises the first sterile housing 3 of cylindrical tubular form which, in its upper extreme part, comprises a lateral opening 21 permanently connected by a supply conduit 22 to a first storage reservoir (not shown) containing a first pasty or liquid product under pressure. The bottom of the housing 3 presents an outlet opening 23 which is connected either permanently (FIGS. 2b, 4 and 6), or intermittently (FIG. 8) to a second housing 24, (FIG. 7) if necessary likewise sterile.

The first housing 3 constitutes the dosing part 20a of the doser-dispenser 20 and the second housing 24 constitutes the dispensing part 20b of said doser-dispenser 20. The first housing 3 presents a cylindrical configuration and comprises, from top to bottom, an upper supply chamber 25 permanently connected to the conduit 22 and therethrough to the first storage reservoir, and a lower dosing chamber 26 which may have a diameter slightly smaller than that of the supply chamber 25. The lower end of the supply chamber 25 joins the upper end of the dosing chamber 26 by a truncated annular contraction 27 narrowing from top to bottom in the direction of the dosing chamber 26. A doser-piston 28 is movably mounted in the dosing chamber 26 and may slide in tight manner therein between a lower, so-called delivery position, and an upper, so-called suction position, in which it is located, if necessary, just below the truncated contraction 27 and separates the supply chamber 25 from the dosing chamber 26. However, the upper position of the dosing piston 28, in the same way as the lower position thereof, may vary as a function of the quantity of product to be dosed per stroke of said doserpiston. Of course, with a view to cleaning and sterilization, the doser-piston 28 may be placed in a higher position than the normal upper position. In that case, it is located inside the supply chamber 25 and the cleaning fluid may circulate around the doser-piston 28. This doser-piston 28 is fixed to the lower end part of the section 2a of the first control tube 2 via a transverse flange having the shape of a circular or truncated disc 29 and several spacer rods 30 extending parallel to the axis of the first control tube 2 between the periphery of the flange 29 fast with said first tube 2 and that of the doser-piston 28 which comprises a central passage 31 adapted to be obturated by the obturation member 32a of an intake valve 32, the doser-piston 28 constituting the element equivalent to the movable member 4 of the intermediate assembly 1 described with reference to FIG. 1. As may be seen in particular in FIGS. 2a, 2b and 3 to 5, the doser-piston 28 comprises on its periphery an annular 0-ring 33 provided with two lips 33a, 33b which define an annular groove 33c open in the direction of the supply chamber 25 and the spacer rods 30 are fixed, on the one hand, to the periphery of the circular flange 29 and, on the other hand, on the doser-piston 28 between the 0-ring 33 and the central passage 31 thereof.

The first control tube 2 passes through the upper wall 3a of the housing 3 and in the manner described with reference to FIG. 1, and is axially guided therein during its alternately ascending and descending movements controlled by a double-acting jack 34. The upper end of the first control tube 2 is therefore fixed to the piston rod 34a of the jack, for example pneumatic jack 34, whose cylinder is fixed. The connection between the lower end of the piston rod 34a of the jack 34 is effected by any appropriate means such as a connecting device 134 fixed on the one hand to the piston rod 34a and, on the other hand, to the upper end of the first control tube 2. The lower end of the first control tube 2 is obturated in tight manner with respect to the interior of the housing 3, in the manner described hereinbelow. As in the example of FIG. 1, the first control tube 2 is surrounded, on its section 2a penetrating in the housing 3, by a first bellows 6 of which the upper end is fixed in tight manner on the housing wall 3a traversed by said first tube 2 and of which the lower end is fixed in tight manner on the lower end part of said first tube 2. Likewise in manner identical or similar to the example of FIG. 1, each annular fold 6d is associated with a rigidifying ring 8 inside said bellows 6, these rings 8 being capable of sliding along the first tube 2, and the annular space 9 between the first bellows 6 and the first control tube 2 is permanently connected to the outside atmosphere in the manner described previously, particularly with reference to FIG. 1.

The obturation member 32a of the intake valve 32 presents the form of a flap and, with respect to the doser-piston 28, is disposed towards the supply chamber 25, at least when said doser-piston 28 occupies its upper position in the vicinity of the truncated contraction 27, the upper edge of the central passage 31 made in the doser-piston 28 constituting the valve seat 32b of said intake valve 32. The central passage 31 of the doser-piston 28 advantageously presents a truncated shape which widens from the supply chamber 25 towards the dosing chamber 26. The admission flap 32a of the intake valve is disposed in the housing 3 between the lower end of the first control tube 2 in the vicinity thereof, and the central passage 31 of the doser-piston 28 spaced apart by a determined distance from the lower end of said first tube 2 whilst being fixed thereon. Thanks to this arrangement, the admission flap 32a may effect its movements of opening and of closure between the upper face of the doser-piston 28 and the lower end of the first control tube 2. In addition, this admission flap 32a is carried by the closed lower end of a second control tube 35 guided in the first control tube 2 and projecting beyond the lower end thereof below the circular or truncated flange 29. At its upper end, the second control tube 35 carries a piston 36 which slides in tight manner in the upper end part of the first control tube 2 and separates the interior of said upper end part into an upper chamber 2c and a lower chamber 2d which, at its lower end, is defined either by an inner annular shoulder 2h (FIG. 2a) or by a transverse annular partition 37 integral with the first control tube 2 and guiding in tight manner the upper end part of the second control tube 35 (FIGS. 3, 4, 6 and 8). The upper chamber 2c is, in the example of FIGS. 2a, 2b, connected through a central bore 134a and a control valve (not shown), either to atmosphere or to a source of compressed air, whilst, in the case of FIGS. 3, 4, 6 and 8, this chamber 2c is permanently connected to the atmosphere. The lower chamber 2d is connected either permanently to the atmosphere through at least one transverse orifice 2b of the tube 2, the annular space 9 and the non-tight passage of the tube 2 in the upper wall 3a of the housing 3 (cf. FIG. 2a), alternately through a connecting orifice 2e and a control valve (not shown), either to atmosphere or to a source of compressed air (FIGS. 3, 4, 6 and 8). In the case of the variant shown in FIG. 2a, the lower chamber 2d is extended downwardly inside the first control tube 2 as far as a second inner annular shoulder 2i which serves as a bearing for the lower end of a return spring 18 here surrounding the upper part of the second control tube 35, and at its upper end, abutting on the control piston 36 of said second tube 35. In that case, the return spring 18 acts via the second tube 35 in the sense of opening the intake valve 32 and always against the pressure which may be established in the upper chamber 2c and which leads to the closure of said valve 32. This arrangement is particularly advantageous when it is desired to obtain a rapid, virtually instantaneous closure of the intake valve 32. According to the embodiments shown in FIGS. 3, 4, 6 and 8, the return spring 18 is disposed in the upper chamber 2c and, abutting, on the one hand, against the piston of the jack 34 and, on the other hand, against the upper wall of the first control tube 2, urges the admission flap 32a permanently against its seat 32b, i.e. in the direction of closure of the intake valve 32 in the absence of an air pressure established in the lower chamber 2d. The lower end part 35a of the second control tube 35, end part 35a projecting from the lower end of the first control tube 2, is surrounded by a second bellows 38 whose structure is identical or similar to that of the bellows 6 of the example described with reference to FIG. 1 and of which each annular fold also comprises a rigidifying ring 8 capable of sliding along the second control tube 35. The upper end 38a of the second bellows 38 is fixed in tight manner on the lower end of the first control tube 2 or an element integral therewith below the flange 29 and the first bellows 6, and the lower end 38b of said second bellows 38 is fixed in tight manner either on the lower end of said second control tube 38, or on the admission flap 32a integral with said second tube 35. In this way, the lower end of the first control tube 2 is obturated in tight manner with respect to the interior of the housing 3. The annular space 39 between the lower end part 35a of the second control tube 35 and the second bellows 38 is permanently connected to the outside atmosphere, for example in the case of the embodiments of FIGS. 3, 4, 6 and 8, with the aid of several passages made in the form of short slots or circular orifices 35b in the lower end part 35a of the second tube 35 and in the section of tube 35c remaining inside the space 2g of the first tube 2 below the transverse annular partition 37, this space 2g being connected to atmosphere through one or more orifices 2b made in the wall of the first tube 2 just below said partition 37. In addition, the upper chamber 2c communicates through a central orifice of the piston 36 with the interior of the second control tube 35 and consequently with the outer atmosphere. As mentioned hereinbefore, the lower chamber 2d of the upper end part of the first control tube 2 may be alternately connected to a source of compressed air or to the outside atmosphere through a connecting orifice 2e provided in the wall of said tube 2 just above the transverse partition 37. It should also be noted that the second control tube 12 of the example of FIG. 1 performs the same function or a function similar to that of the second tube 35 of FIGS. 2a, 2b, 3, 4 and 8.

Thanks to the particular features which have just been described, the reciprocating movements of the doser-piston 28 are effected without producing noteworthy depressions or overpressures in the dosing chamber 26, the admission flap 32a automatically acting as evacuation flap if, for some reason or other, the delivery pressure applied to the dosed quantity of the product by the doser-piston 28 exceeds a predetermined value. In addition, as the closure of the intake valve is effected by means of the second control tube 35 at the end of the ascending or suction stroke and before the beginning of the descending or delivery stroke, the dosage of the product is effected with a very high precision. Furthermore, the supply of the product under a certain pressure ensures complete filling of the dosage chamber 26 with the product without the appearance of a noteworthy depression during the ascending stroke of the doser-piston 28 to the open intake valve 32. The shape and particular arrangement of the 0-ring 33 contribute largely to the precision of the dosage of the product thanks to the very long life, without leakage, of said 0-ring The second housing 24 defines a dispensing chamber 24b connected to the outlet opening 23 of the dosage chamber 26 and contains an ejection valve 40 of which the obturation member 40a such as a flap (FIGS. 3 and 8) or a solid obturation rod, or an ejection tube obturated at its two ends and provided near each end with a lateral opening 41a, 41b (FIG. 7), is carried by the lower closed end (cf FIGS. 3 and 7) or upper end (cf. FIG. 8) of a third control tube 42 which is of structure similar to that of the first control tube 2. The section 42a of the third control tube 42, penetrating in the dispensing chamber or other transfer chamber 24b of the second housing 24, is surrounded by a third bellows 43 of which one end 43a is fixed on the housing wall 24a traversed by the third control tube 42 and of which the other end 43b is fixed in tight manner on the obturation member 40a or on the third tube 42 more or less near the obturation member 40a as a function of the opening stroke of the latter and of the length of the section of the third tube 42, penetrating in the housing 24. There again, each fold of the bellows is associated with a rigidifying ring 8 disposed inside the third bellows 43 and surrounding said third tube 42 so as to be able to slide therealong during the movements of extension or of compression of said bellows 43. The annular space 44 between the third tube 42 and the bellows 43 is permanently connected to the outside atmosphere in the manner described hereinbefore.

Figure 3:
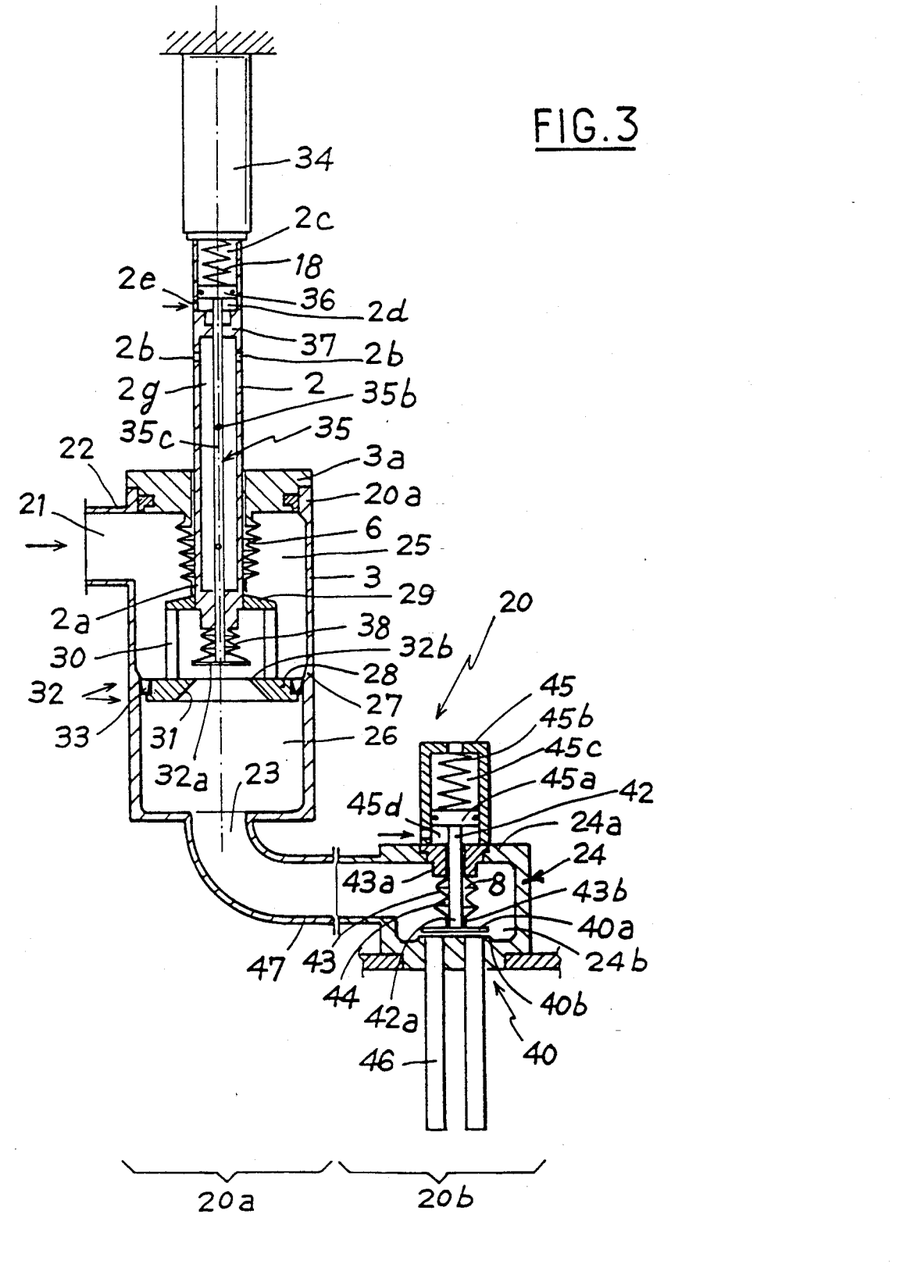
FIG. 3 is a view in elevation of an axial section through a doser-dispenser.

The end of the third control tube 42 opposite the ejection valve 40 and always located outside the dispensing chamber 24b or like housing, carries the control piston 45a of a single-acting jack 45 of which the return spring 45b acts on said piston 45a and thus on the third control tube 42 in the sense either of closure of the ejection valve 40 (examples shown in FIGS. 3 and 8), or in the sense of opening thereof (example not shown). The piston 45a separates the cylinder of the jack 45 into two chambers 45c and 45d of which the one containing the spring 45b is permanently connected to the atmosphere and of which the other is capable of being alternately connected either to the outer atmosphere or to a source of compressed air (not shown). It should be noted that the return spring 45b, instead of being disposed in the upper chamber 45c of the jack 45 as shown in FIG. 3, might also be disposed in the lower chamber 45d, or more generally, in the chamber traversed by the third control tube 42 and might surround the latter. As, in that case, the chamber containing the spring 45b communicates with the atmosphere, the annular space 44 between this tube 42 and the third bellows 43 may directly communicate with said chamber. In that case, the rapid closure of the valve 40 will be controlled by the pressure of compressed air established in the other chamber (here upper chamber 45c) against the pressure of the spring 45b.

The seat 40b of the ejection valve 40 is constituted, in the example of FIG. 3, by the upper end of one or more fixed ejection tubes 46 opening out in the dispensing chamber 24b, the flap 40a of said ejection valve 40 opening in the direction opposite the direction of flow of the product through the or each ejection tube 46.

Figures 6, 7:
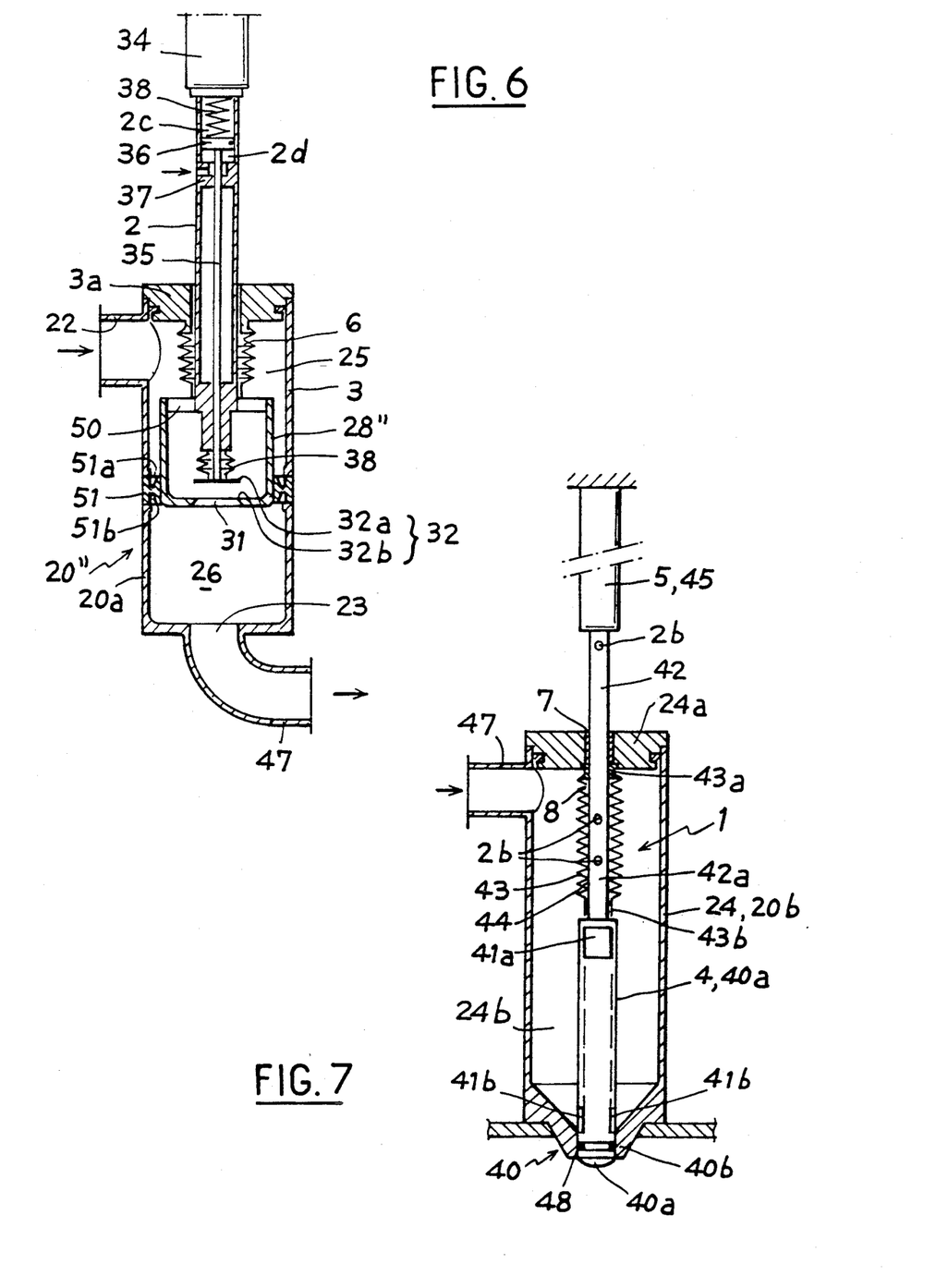
FIG. 6 is a view in elevation of an axial section through another variant of the dosing part of the doser-dispenser.
FIG. 7 is a view in elevation of an axial section through a variant of the dispensing part of the doser-dispenser.

When the obturation member 40a of the ejection valve 40 is a solid rod or a section of tube obturated at the two ends, the seat of the valve 40 is constituted, as in the example of FIG. 7, by a fixed nozzle 40b provided at the lower end of the dispensing chamber 24b. In that case, the ejection valve 40 is closed when the lower end of the rod 40a penetrates in tight manner in the cylindrical space of the fixed nozzle 40b, and it is open when the lower end of said rod 40a is withdrawn towards the interior of the dispensing chamber 24b so as to clear the cylindrical space for passage of the fixed nozzle 40b.

Figure 8:
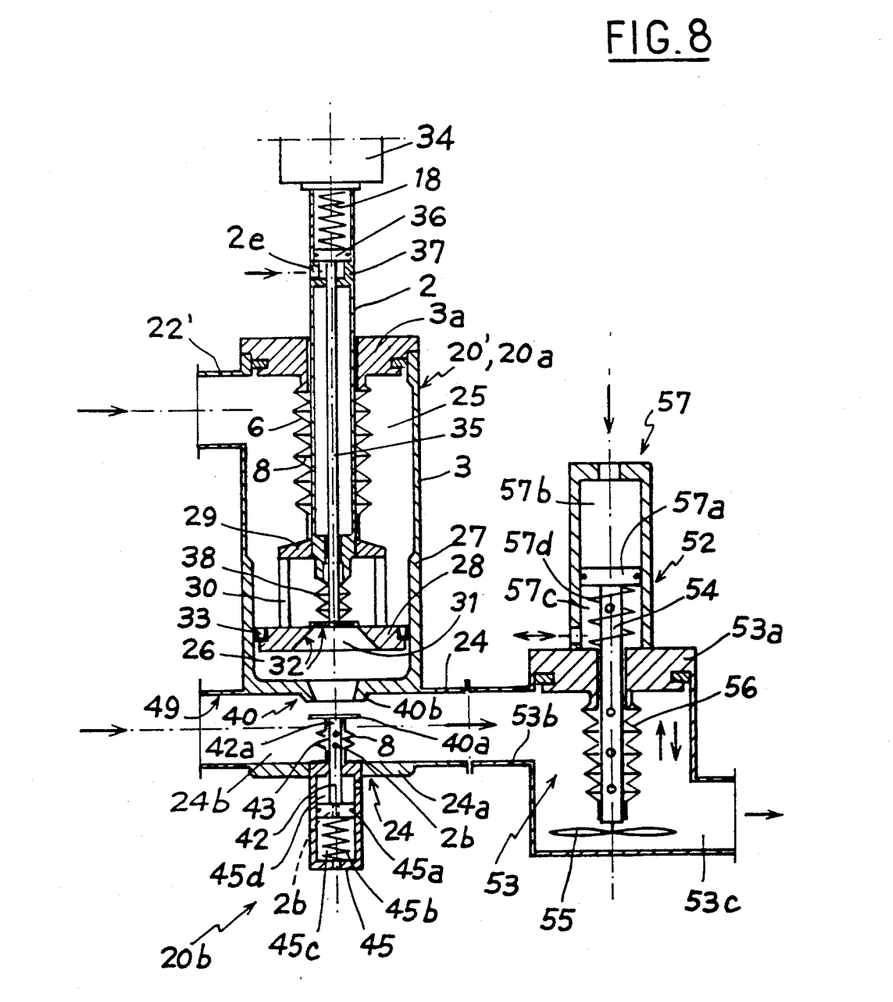
FIG. 8 is a view in elevation of an axial section through a variant of the doser-dispenser of which the downstream side is connected to a mixer also using the screen device.

The dispensing part 20b of the doser-dispenser 20, part 20b as shown in FIG. 3 and connected by a connecting conduit 47 to the outlet 23 of the dosing chamber 26 of the dosing part 20a, may advantageously be replaced by the variant shown in FIG. 7, particularly when it is necessary to introduce the product in a receptacle near the bottom thereof. In that case, as indicated hereinbefore, the obturation member 40a of the ejection valve 40 is constituted by an axially mobile ejection tube obturated at the two ends and comprising, near each end, at least one lateral opening 41a, 41b. The valve seat 40b is then constituted by a cylindrical guiding nozzle provided in the bottom wall of the dispensing chamber 24b. In an upper position of the ejection tube 40a, its lower end provided with an annular 0-ring 48 is located inside the guiding nozzle 40b and the lower lateral opening 41b of the mobile ejection tube 40a is then located near the bottom of the dispensing chamber 24b and, if necessary, at least partially inside the latter. In a lame position of the ejection tube 40a, its lower lateral opening 41b lies outside the dispensing chamber 24b and its upper lateral opening is located inside this chamber 24b near the bottom thereof.

According to the variant of FIG. 7, the ejection tube 40a, whose upper end is fixed to the lower end of the third control tube 42, presents, when the ejection valve 40 is closed, inside the dispensing chamber 24b, a length substantially equal to the length of the section 42a of the third control tube 42, said section 42a penetrating in the dispensing chamber 24b, and the outer diameter of the third bellows 43 surrounding said tube section 42a is slightly larger than that of the ejection tube 40a, with the result that the reduction in the volume occupied by said ejection tube 40a inside the dispensing chamber 24b, is compensated by the increase in the volume occupied by the third bellows 43 inside said chamber 24b.

The structure of the doser-dispenser 20' as shown in FIG. 8 is identical to that of the doserdispenser 20 of FIG. 3 concerning the dosing part, but differs therefrom concerning the dispensing part 20b. The supply chamber 25 of the doser-dispenser 20' is permanently connected to the conduit 22' and therethrough to a second storage reservoir containing a product, preferably different from that contained the first storage reservoir associated with the doser-dispenser 20 of FIGS. 2a, 2b and 3.

The dispensing part 20b of the doser-dispenser 20' of FIG. 8 comprises, as second housing 24 or dispensing chamber 24b, a transverse section of conduit 49 which is disposed horizontally below the dosing chamber 26 and perpendicularly to the axis of the dosing chamber 26 and is capable of being connected to the latter through the ejection valve 40 of which the seat 40b is constituted by a fixed nozzle provided in the bottom wall of said dosing chamber 26 and of which the flap 40a disposed in said dispensing chamber 24b opens in the direction of flow of the product through said fixed nozzle 40b. This transverse section of conduit 49 may in addition be connected, at one of its ends, to a storage reservoir or the outlet of a dosing station (FIGS. 2a, 2b for example) and, at the other end, to a product dispensing station 20b or to the inlet of the supply chamber 25 of a doser-dispenser 20 for example in accordance with the one shown in FIG. 3. In the case of the doser-dispenser 20' of FIG. 8, the intake valve 32 and the ejection valve 40, in the same way as the three control tubes 2, 35 and 42, are aligned along the same vertical axis which, at the same time, constitutes the vertical axis of the dosing part 20a and of the dispensing part 20b of the doser-dispenser 20'.

The embodiment of the dosing part 20a of the doser-dispenser 20" shown partially in FIG. 6 differs from the example of the dosing part 20a of the doserdispenser 20 according to FIG. 3, only in that, according to FIG. 6, the doser-piston 28"has the form of a cylindrical pot which is upwardly open in the direction of the supply chamber 25, of which the upper edge is fixed with the aid of several radial arms 50 to the lower end part of the first control tube 2, of which the bottom comprises the central passage 31 and the seat 32b for the flap 32a of the intake valve 32 and of which the lateral wall is guided in tight manner by an annular 0-ring 51 fixed to the cylindrical wall of the first housing 3 at the upper end of the dosing chamber 26 and as the flap 32a of the intake valve 32 and the second bellows surrounding the lower part of the second control tube 35 are disposed inside said doser-piston 28". According to an additional difference with respect to the example of FIG. 3, the 0-ring 51 comprises two vertically superposed annular grooves 51a and 51b of which groove 51a is open towards the supply chamber 25 and groove 51b towards the dosing chamber 26. All the other elements, arrangements or configurations of the dosing part 20a of the doserdispenser 20" are identical or similar to those of the dosing part 20a of the doser-dispenser 20 of FIG. 3 and consequently have the same reference characters and will not be described in detail.

Figure 9:
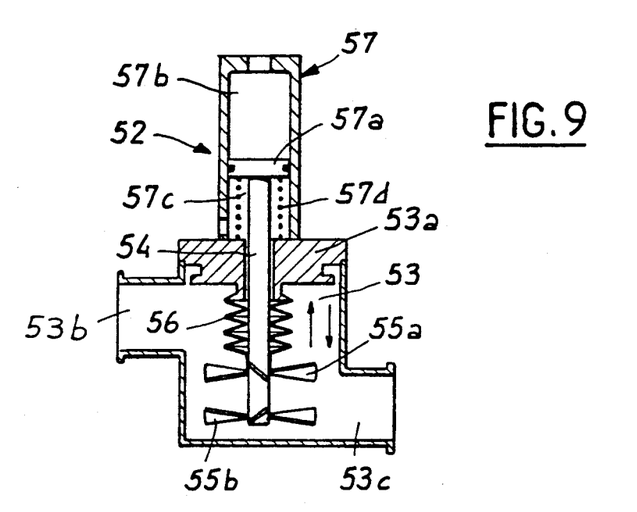
FIG. 9 is a view in elevation of an axial section through a variant of the mixer of FIG. 8.
Figure 10:
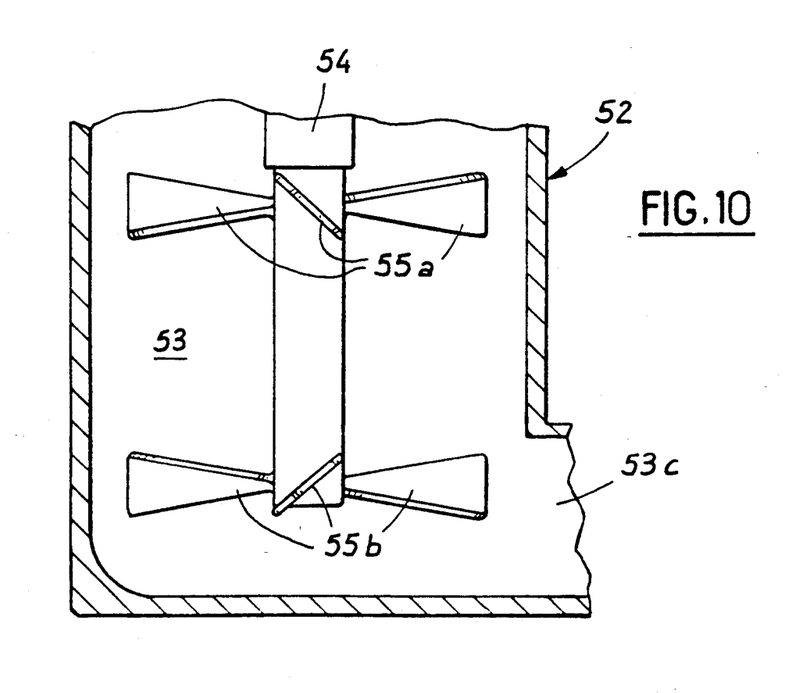
FIG. 10 is an enlarged view of the lower part the mixer of FIG. 9.

As may be seen on the right-hand side of FIG. 8 and FIGS. 9 and 10, the intermediate assembly 1 of FIG. 1 may also find application within the framework of a mixer of products 52. This mixer 52 is partly disposed in a mixing chamber 53 or an enlarged part of a supply conduit and comprises at the free end, preferably at the closed lower end of a fourth, axially mobile, vertical control tube 54, at least one pair of mixing blades 55 (FIG. 8). According to the example of FIGS. 9 and 10, there are provided on the extreme lower part of the fourth control tube 54 two sets of four mixing blades 55a and 55b vertically superposed at a predetermined distance, the four blades of each set of blades being disposed in cross form and presenting for one set of blades a right-hand pitch and, for the other, a left-hand pitch. In the same way as described hereinabove, with reference to the third control tube 35 of the example of FIG. 3, the fourth control tube 54 is surrounded by a fourth bellows 56 on its part penetrating in the mixing chamber 53 and located above the mixing blades 55 or 55a and 55b, the lower end of said bellows 56 being fixed in tight manner on the fourth tube 54 and the upper end of said bellows 56 being fixed in tight manner on the upper wall 53a of the mixing chamber 53, wall 53a through which said tube 54 passes. The upper end of the fourth tube 54 carries the control piston 57a of a jack 57 whose interior is subdivided by said piston 57a into two chambers 57b and 57c of which chamber 57b is capable of being connected alternately to a source of compressed air and to atmosphere and chamber 57c contains a return spring 57d acting against the resultant force exerted by the compressed air on the piston 57a, with the result that the blades 55 or 55a and 57b are driven alternately in ascending and descending movements. The upper inlet 53b of the mixing chamber 53 is connected via the section of conduit 49 to a first storage reservoir of a product under pressure and through said section 49 and the ejection valve 40 to the dosing part 20a of a doserdispenser 20' (cf. FIG. 8) which receives in its supply chamber 25 another product under pressure delivered in dosed quantity into the section of conduit 49 through the ejection valve 40 of said doser-dispenser 20'. The lower outlet 53c of the mixing chamber 53 is connected to the upper inlet 21 of a supply chamber of another (first) doser-dispenser 20 (cf. FIGS. 2a, 2b, 3 to 5) or 20" (cf. FIG. 6).

It should be noted that the structure of the fourth control tube 54 and of the fourth bellows 56 is similar to that of the second control tube 35 and of the second bellows 38, with the result that it is unnecessary to describe them in greater detail.

Figures 4, 5:
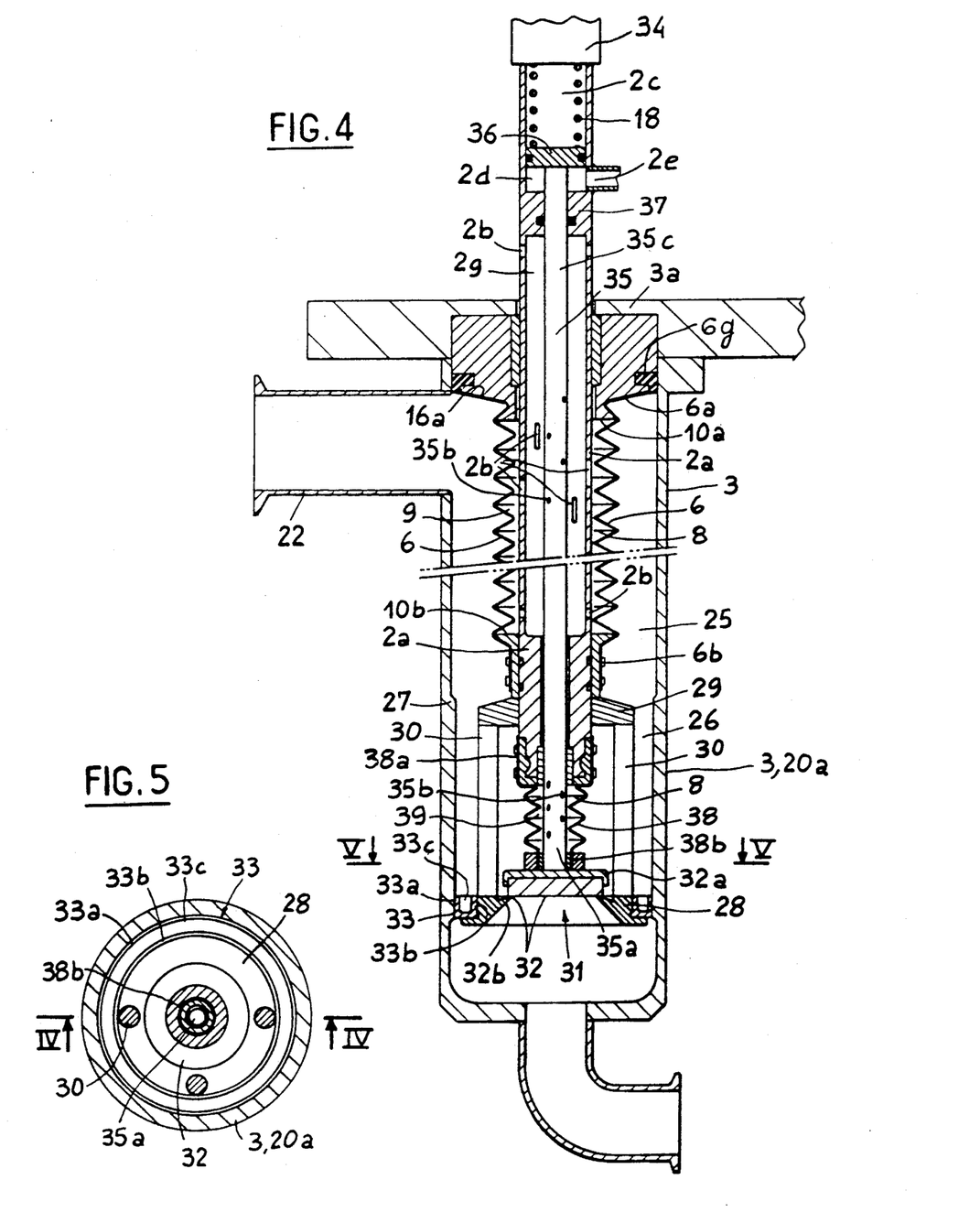
FIG. 4 is an enlarged view in elevation of an axial section showing in greater detail a variant of the dosing part of the doser-dispenser, this section being made along line IV—IV of FIG. 5.
FIG. 5 is a plan view of the dosing part of the doser-dispenser along line V—V of FIG. 4.

When two doser-dispensers are used, mounted in series, it is advantageous to use as upstream doser-dispenser the one (20') shown in FIG. 8 and as downstream doser-dispenser the one (20) shown in FIGS. 3 to 5 or the one (20") shown in FIG. 6.

In certain cases, it is advantageous to interpose between the outlet of the upstream doser-dispenser 20' (FIG. 8) and the inlet of the downstream doser-dispenser 20 or 20" a mixer 52 of the type shown in FIG. 8 or in FIGS. 9 and 10.

It may also be advantageous to use in place of a pneumatic double-acting jack 34 for the reciprocating displacements of the first control tube 2 and of the doser-piston 28 or 28" which is integral therewith, a fastening plate 134b (FIG. 2a) carrying the upper end of said first tube 2 driven in its vertical reciprocating displacements by an electric jack of which the speeds of displacement have a sinusoidal appearance.

The invention may undergo a certain number of modifications within the understanding of those skilled in the art without departing from the scope of protection defined by the accompanying claims.

What is claimed is:

1. A doser-dispenser for at least one pasty and/or liquid product contained under pressure in at least a first storage reservoir, said doser-dispenser comprising in a first cylindrical housing, an upper supply chamber connected by a supply conduit to said first reservoir, and a lower dosing chamber separated from said supply chamber by a doser piston fixed to the lower end of a control member penetrating in said first housing, said doser piston being slidable in tight manner in said first housing and provided with a central passage adapted to be obturated by an intake valve having a first obturation member urged by a return spring, said intake valve being guided with respect to said doser piston and cooperating with a valve seat surrounding said central passage, a dispensing chamber downstream of the dosing chamber and an ejection valve in said dispensing chamber having a second obturation member loaded by a second spring, characterized in that:
the control member of the doser-piston is constituted by a first control tube having one end adjacent to said intake valve which is obturated in tight manner; said first obturation member of the intake valve is situated on a side of the supply chamber and is carried by a lower closed end of a second control tube guided in the first control tube and extending beyond the lower end thereof; a first bellows surrounds a first section of said first control tube penetrating into said housing to form an annular space between said first bellows and said first section of the first control tube which is permanently connected to the outside atmosphere; the upper end of said first bellows surrounding the first control tube is fixed in tight manner to a housing wall traversed by said first tube and the lower end of the first bellows is fixed in tight manner to the lower end of said first tube; a second bellows surrounds the second control tube, over a section thereof extending beyond the lower end of the first control tube, said second bellows having an upper end fixed in tight manner to the lower end of the first tube below the first bellows, while a lower end of the second bellows is fixed in tight manner to the lower end of the second control tube or to said first obturation member carried on said second control tube, said second control tube having an upper end part guided in tight manner in the first tube and including, at said upper end part, a control piston which separates the volume of the first tube into an upper chamber and a lower chamber, one of which is connected to atmosphere and contains said return spring acting on said first obturation member, the other of said chambers being capable of being connected alternately to a source of compressed air or to atmosphere, the pressure of compressed air established in said other chamber acting on said first obturation member in a direction opposite that of said return spring thereof.

2. A doser-dispenser according to claim 1, wherein the second obturation member of the ejection valve is carried by the closed end of a third control tube which, on a third section, penetrating in the dispensing chamber of the housing, is surrounded by a third bellows whose ends are fixed in tight manner, on the side of the third obturation member of the ejection valve, on said third tube and, on the housing wall traversed by said third control tube whose other en carries, outside said housing traversed by the product, a control piston of a jack comprising two chambers one of which is capable of being connected alternately to the outside atmosphere or to a source of compressed air and the other of which is provided with a return spring acting on said position and the third obturation member, against the air pressure established in said one chamber of the jack in the sense of opening or closing the ejection valve.

3. A doser-dispenser according to claim 1 wherein each annular fold of each bellows is associated with a rigidifying ring disposed in said bellows and capable of sliding along the corresponding control tube, the annular space between each bellows and the corresponding tube communicating permanently with the outside atmosphere.

4. A doser-dispenser according to claim 1, wherein the upper part of the first control tube constitutes a control jack having a control piston fast with the upper end of the second control tube to separate said upper end into said upper chamber located permanently outside the first housing and into said lower chamber provided in a section of the first tube capable of penetrating into the housing during a descending movement of the doser-piston; said upper chamber is capable of being alternately connected to a source of compressed air or to atmosphere while said lower chamber is provided with said return spring which surrounds the upper part of the second control tube and abuts, on the one hand, against an inner shoulder of the first tube and, on the other hand, the lower face of said control piston acts in the sense of opening the intake valve against the compressed air pressure established periodically in the upper chamber.

5. A doser-dispenser according to claim 1, wherein said first control tube comprises a plurality of passages connecting the interior of the tube to the annular space existing between the section of tube and the first bellows and to the outside atmosphere.

6. A doser-dispenser according to claim 3, wherein each end of at least said first bellows comprises half-folds respectively associated with upper and lower baring shoulders having faces opposite the first bellows and extending perpendicularly to the longitudinal axis of the control tube and parallel to the rigidifying rings; the upper bearing shoulder located at the level of the upper housing wall is provided on said housing wall traversed by the first control tube; the lower bearing shoulder located towards said doser-piston is integral with said first tube; and, in compacted position of the first bellows, each fold of the first bellows is applied, against an adjacent fold and, against the rigidifying ring covered by said fold and each half-fold bears against the corresponding bearing shoulder.

7. A doser-dispenser according to claim 1, wherein at least said first bellows comprises at each end a profiled fixing bead to which is joined a corresponding nd half-fold of the first bellows, said profiled fixing head having annular grooves and ribs cooperating with a retaining housing of corresponding shape provided either on a bearing shoulder, on the wall of the housing or a lower bearing shoulder on the end of the first control tube bearing said doser-piston.

8. A doser-dispenser according to claim 1, where said annular space between the second bellows and the second control tube is connected to the outside atmosphere through a plurality of passages provided in the section of the second control tube located opposite the second bellows, as well as through at least one orifice provided in said second control tube in a part thereof located permanently outside said housing.

9. A doser-dispenser according to claim 1, wherein said annular space between the first bellows and the first control tube is connected to the outside atmosphere through a plurality of passages provided in the first section of the first control tube located opposite said first bellows as well as through at least one orifice provided in said first control tube in a part thereof located permanently outside said housing.

10. A doser-dispenser according to claim 1, wherein an outlet of the dosing chamber is connected to a dispensing chamber by a connecting conduit one end of which is connected directly to the outlet of the dosing chamber and the other end of which opens into said dispensing chamber in which is disposed the ejection valve, and a second control piston of the second obturation member of said ejection valve is disposed in a jack chamber capable of being connected to a source of compressed air acting on said second piston in the sense of opening or closing the ejection valve against the second return spring bearing against said second piston.

11. Doser-dispenser according to claim 10, wherein said dosing chamber is capable of being connected to the dispensing chamber through the ejection valve whose seat is constituted by a fixed nozzle provided in a bottom wall of said dosing chamber; the dispensing chamber is constituted by a transverse section of conduit disposed horizontally below the dosing chamber and perpendicularly to an axis thereof; and the second obturation member of the ejection valve disposed in the dispensing chamber, opens in the direction of flow of the product through said fixed nozzle.

12. A doser-dispenser according to claim 1, wherein the first obturation member comprises a first flap and the second obturation member comprises a second flap, said second flap having a seat constituted by the upper end of at least one fixed ejection tube opening into the dispensing chamber, said second flap opening said ejection valve on moving in a direction opposite the direction of flow of the product through the ejection tube.

13. A doser-dispenser according to claim 1, wherein the second obturation member of the ejection valve is constituted by a solid obturation rod and the seat of said ejection valve is constituted by a fixed ejection nozzle provided at the lower end of the dispensing chamber in which penetrates, in tight manner, the lower end of said solid obturation rod whose upper end is integral with the lower end of a third control tube.

14. A doser-dispenser according to claim 1, wherein the second obturation member of the ejection valve is constituted by an axially movable ejection tube obturated at the upper and lower ends an comprising, near each end, at least one lateral opening; the seat of said ejection valve is constituted by a cylindrical guiding nozzle provided in a bottom wall of the dispensing chamber and in which is guided the ejection tube whose lateral opening is located inside the cylindrical guiding nozzle in closed position of the ejection valve; the upper end of the ejection tube is fixed on the lower end of a third control tube disposed coaxially with said ejection tube and, in closed position of the ejection valve, the length of the section of the third control tube penetrating into the dispensing chamber, is substantially equal to the length of the ejection tube inside said dispensing chamber and the outer diameter of a third bellows surrounding said third tube is slightly larger than that of said ejection tube, whereby when the ejection tube lowers, the reduction in the volume occupied by said ejection tube in said dispensing chamber is compensated by the increase in the volume occupied by said third bellows inside said dispensing chamber.

15. A doser-dispenser according to claim 1, wherein the central passage of the doser-piston has a truncated form which widens from the supply chamber towards the dosing chamber.

16. A doser-dispenser according to claim 1, wherein the doser-piston comprises on its periphery an annular Oring with two lips which define an annular groove open in the direction of the supply chamber.

17. Doser-dispenser according to claim 1, wherein the doser-piston is fixed to the lower end of the first control tube by a transverse flange integral with said first tube and a plurality of spacer rods parallel to said first tube and fixed to the periphery of the flange and to said doser-piston between the central passage and the O-ring thereof, and the second bellows of the second control tube is located in the space between the doser-piston and the transverse flange.

18. A doser-dispenser according to claim 1, wherein the doser-piston has the shape of a cylindrical pot upwardly open in the direction of the supply chamber, said pot having an upper edge fixed by a plurality of radial arms to a lower end of the first control tube, said pot having a bottom in which said central passage and said seat of the intake valve are provided, said pot having a lateral wall guided in tight manner by an annular O-ring fixed to a wall of the first housing at the upper end of the dosing chamber, the first obturation member of the intake valve and the second bellows being disposed inside said cylindrical pot.

19. A doser-dispenser according to claim 18, wherein said annular O-ring comprises two superposed annular grooves one of which is open towards the supply chamber and the other towards the dosing chamber.

20. A doser-dispenser according to claim 1, comprising a second doser-dispenser for a second paste or liquid product contained in a second storage reservoir associated with the first doser-dispenser and provided upstream thereof; said second doser-dispenser comprises in a second cylindrical housing a second doser-piston provided with a central passage adapted to be obturated by a second intake valve and separating said second housing, on the one hand, into a second upper supply chamber connected by a second supply conduit to a second product reservoir and, on the other hand, into a second lower dosing chamber whose bottom opens outwardly through a second ejection valve into the supply conduit of the first doser-dispenser; the second ejection valve comprises a seat surrounding an outlet opening in the bottom of the dosing chamber as well as a flap provided below said dosing chamber in the supply conduit of the first doser-dispenser and carried by the upper end of a third control tube having a part penetrating into said supply conduit and surrounded by a third bellows whose lower end is located outside said supply conduit and cooperates with a jack urging said flap against its seat in the direction opposite hat of the product expelled from the second dosing chamber.

21. A doser-dispenser according to claim 20, comprising a mixer of products interposed in said supply conduit between the outlet of the second dosing chamber of the second upstream doser-dispenser and the inlet in the supply chamber of the first downstream doser-dispenser, said mixer comprising at least open pair of mixing blades provided in the lower part of a fourth control tube axially movable in a mixing chamber having an upper inlet connected to the dosing chamber of the second upstream doserdispenser and to the outlet of the first storage reservoir and a lower outlet connected to the inlet of the supply chamber of the first downstream doser-dispenser, and a fourth bellows surrounding the fourth control tube on the part penetrating into the mixing chamber outside which said fourth tube carries a control piston sliding in tight manner in a jack and separating inside the jack a first chamber capable of being connected to a source of compressed air, and a second chamber containing a return spring.

22. A doser-dispenser according to claim 21, wherein said mixer further comprises at least tow superposed pairs of mixer blades of which a first pair has a right-hand pitch and the other pair has a left-hand pitch.

* * * * *